United States Patent [19]

Abraham et al.

[11] Patent Number: 5,237,616
[45] Date of Patent: Aug. 17, 1993

[54] SECURE COMPUTER SYSTEM HAVING PRIVILEGED AND UNPRIVILEGED MEMORIES

[75] Inventors: Dennis G. Abraham, Concord, N.C.; Steven G. Aden, Cedar Park, Tex.

[73] Assignee: International Business Machines Corporation, Armonk, N.Y.

[21] Appl. No.: 947,871

[22] Filed: Sep. 21, 1992

[51] Int. Cl.5 .................... H04L 9/00; G06F 12/14
[52] U.S. Cl. .................................. 380/49; 380/50; 395/425
[58] Field of Search .................. 380/49, 50, 52; 395/425, 725, 400, 575; 365/195, 228

[56] References Cited

U.S. PATENT DOCUMENTS

| | | | |
|---|---|---|---|
| 3,742,458 | 6/1973 | Inoue et al. | 395/425 |
| 3,803,559 | 4/1974 | Bandoo et al. | 395/425 |
| 3,827,029 | 7/1974 | Schlotterer et al. | 395/425 |
| 4,298,934 | 11/1981 | Fischer | 395/425 |
| 4,355,355 | 10/1982 | Butwell et al. | 395/400 |
| 4,434,464 | 2/1984 | Suzuki et al. | 395/425 |
| 4,523,271 | 6/1985 | Levien | 395/575 |
| 4,628,479 | 12/1986 | Borg et al. | 395/425 |
| 4,677,546 | 6/1987 | Freeman et al. | 395/425 |
| 4,920,518 | 4/1990 | Nakamura et al. | 365/228 |
| 4,975,878 | 12/1990 | Boddu et al. | 365/195 |
| 5,014,191 | 5/1991 | Padgaonkar et al. | 395/425 |
| 5,075,842 | 12/1991 | Lai | 395/425 |
| 5,075,845 | 12/1991 | Lai | 395/425 |
| 5,081,675 | 1/1992 | Kittirutsunetorn | 380/49 |
| 5,134,700 | 7/1992 | Eyer et al. | 395/425 |
| 5,146,575 | 9/1992 | Nolan, Jr. | 395/425 |
| 5,159,629 | 10/1992 | Pouble et al. | 380/52 |
| 5,182,811 | 1/1993 | Sakamura | 395/725 |
| 5,201,039 | 4/1993 | Sakamura | 395/425 |

Primary Examiner—Salvatore Cangialosi
Attorney, Agent, or Firm—Karl O. Hesse

[57] ABSTRACT

The microprocessor resides along with its protected real address space in a secure module surrounded by tamper resistant circuitry pad. Encryption programs and encryption keys are stored in the protected memory. A second real address space is also connected to the address and data bus of the microprocessor in order to provide program and data space for a user. Gating circuitry prevent the exposure of instructions and data form the privileged memory from appearing outside of the secure module. The gating circuits switch address spaces by recognizing a sequence of predetermined addresses.

6 Claims, 3 Drawing Sheets

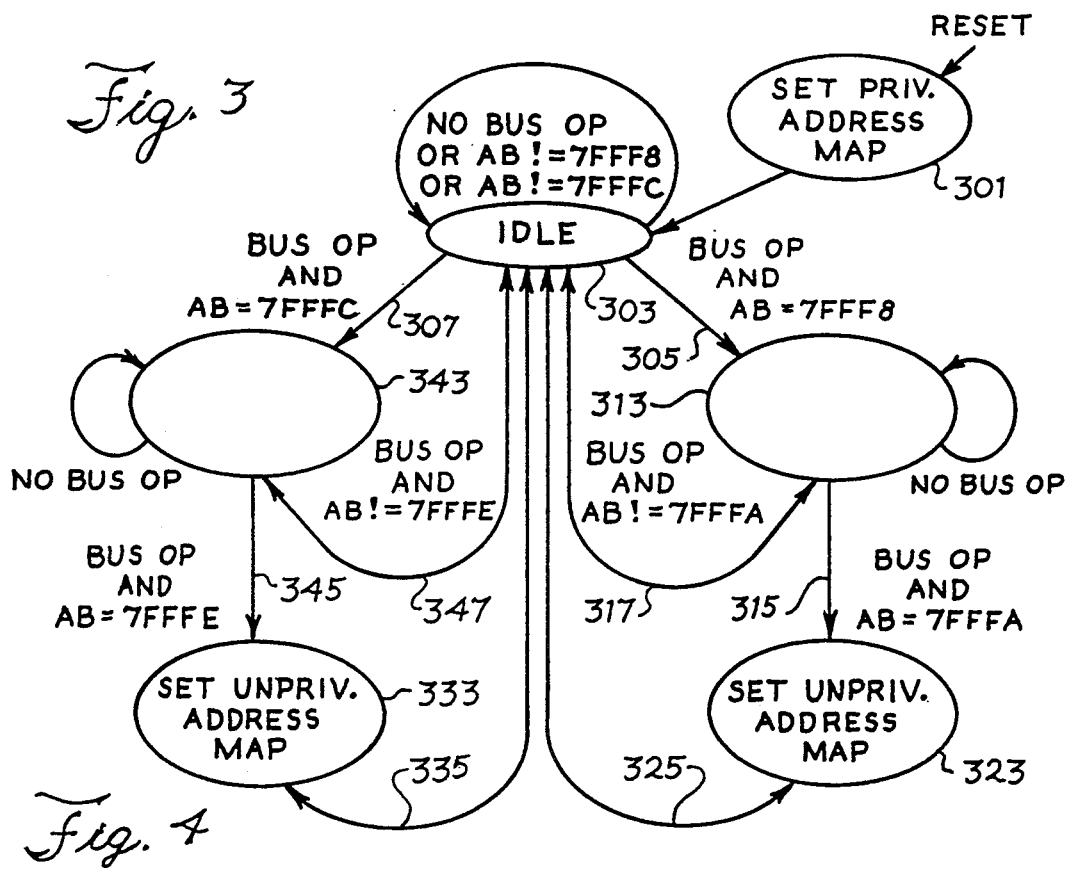

| ACTIVE MODE | I/O ACCESS | MEMORY ACCESS | PCSO ACTIVE | ADDRESS RANGE | UNPROTECTED DATA BUS TRANSCEIVER |
|---|---|---|---|---|---|
| UNPRIV. OR PRIV. | YES | NO | NO | X'0000'-X'FFFF' | ACTIVE |
| PRIV. | YES | NO | YES | X'0000'-X'FFFF' | DISABLED |
| PRIV. | NO | YES | X | X'00000'-X'7FFF7' X'80000'-X'FFFFF' | DISABLED |
| UNPRIV. OR PRIV. | NO | YES | X | X'7FFF8'-X'7FFFF' | DISABLED |
| UNPRIV. | NO | YES | X | X'00000'-X'7FFF7' X'80000'-X'FFFFF' | ACTIVE |
| UNPRIV. OR PRIV. | NO | REFRESH | X | X'00000'-X'FFFFF' | DISABLED |

SECURE COMPUTER SYSTEM HAVING PRIVILEGED AND UNPRIVILEGED MEMORIES

FIELD OF THE INVENTION

The invention relates to apparatus and method permitting a computer to be operated in a secure mode to provide cryptographic functions without comprising any of the cryptographic programs, encryption keys or other secret information and alternatively operating the same computer using different real memory space to allow the user of the system to program new cryptographic functions without compromising or allowing access to the privileged memory content.

RELATED APPLICATIONS

The User Defined Function Facility in U.S. application, Ser. No. 07/834,634 has examples of programs that may be stored into the unprotected memory in order to provide new cryptographic functions.

BACKGROUND OF THE INVENTION

Multiple memory address spaced are known in the art and include virtual memory address spaces as exemplified in U.S. Pat. No. 4,355,355 as well as real address spaced. In one example of multiple real address spaces, a first address space is used for programs and the second address space is used for data. All instruction fetches are directed toward the first address space and read/write operations are directed toward the second address space. In this way total memory accessible by a computer has been doubled in the prior art but none of the memory is protected from being read.

Another background patent of interest to this invention is U.S. Pat. No. 4,523,271 "Software Protection Method and Apparatus". In this patent, the address space is divided into a normal address space and read only memory address space. The read only memory address may, for example, be an application cartridge which is plugged into the computer. In order to prevent unauthorized copying of the application in the read only memory cartridge, circuits are added to the cartridge to prevent any read operation of the memory of the cartridge by an instruction that was not itself read from the cartridge. This circuitry allows programs in the cartridge to function normally and execute the application while at the same time preventing programs outside of the read only memory from dumping the content of read only memory as an unauthorized copy.

SUMMARY OF THE INVENTION

The subject invention is concerned with obtaining control over the access to privileged (protected) memory, while at the same time providing a programmable memory available for creation of unique cryptographic functions in order to implement applications desired by the computer user.

Accordingly, it is an advantage of the invention to only access critical data in protected memory using programs residing in protected memory and not allow access to critical data by programs written by others.

It is another advantage of the invention to transfer control from the programs in the protected memory to programs in the unprotected memory in such a way as the prevent programs running in the unprotected memory from reading or writing protected memory.

It is a still further advantage of the invention to allow programs residing in unprotected memory to return control to the programs residing in protected memory.

These and other advantages are accomplished by providing a microprocessor and memory inside of the secure module. Also provided inside the secure module is a logic gate array having a multiple state memory. The gate array switches the microprocessor's operation between a privileged mode using protected memory space and an unprivileged mode using unprotected memory whenever two predetermined addresses in the microcomputer's logical address space are accessed sequentially. These predetermined addresses can be read in both privileged mode using protected address space and unprivileged mode using unprotected address space but they can only be written in privileged mode. Content of the predetermined addresses determine the next instruction to be executed when switching between protected and unprotected address spaces.

Other advantages and features of the invention will be apparent form the following description of the preferred embodiment of the invention when read in conjunction with the drawings and as set forth in claims.

BRIEF DESCRIPTION OF THE DRAWINGS

FIG. 3 is a state diagram showing the control of the gate array to accomplish the objectives of the invention.

FIG. 4 is a table showing the operation of the data gate.

DETAILED DESCRIPTION OF PREFERRED EMBODIMENT

Figure 1:
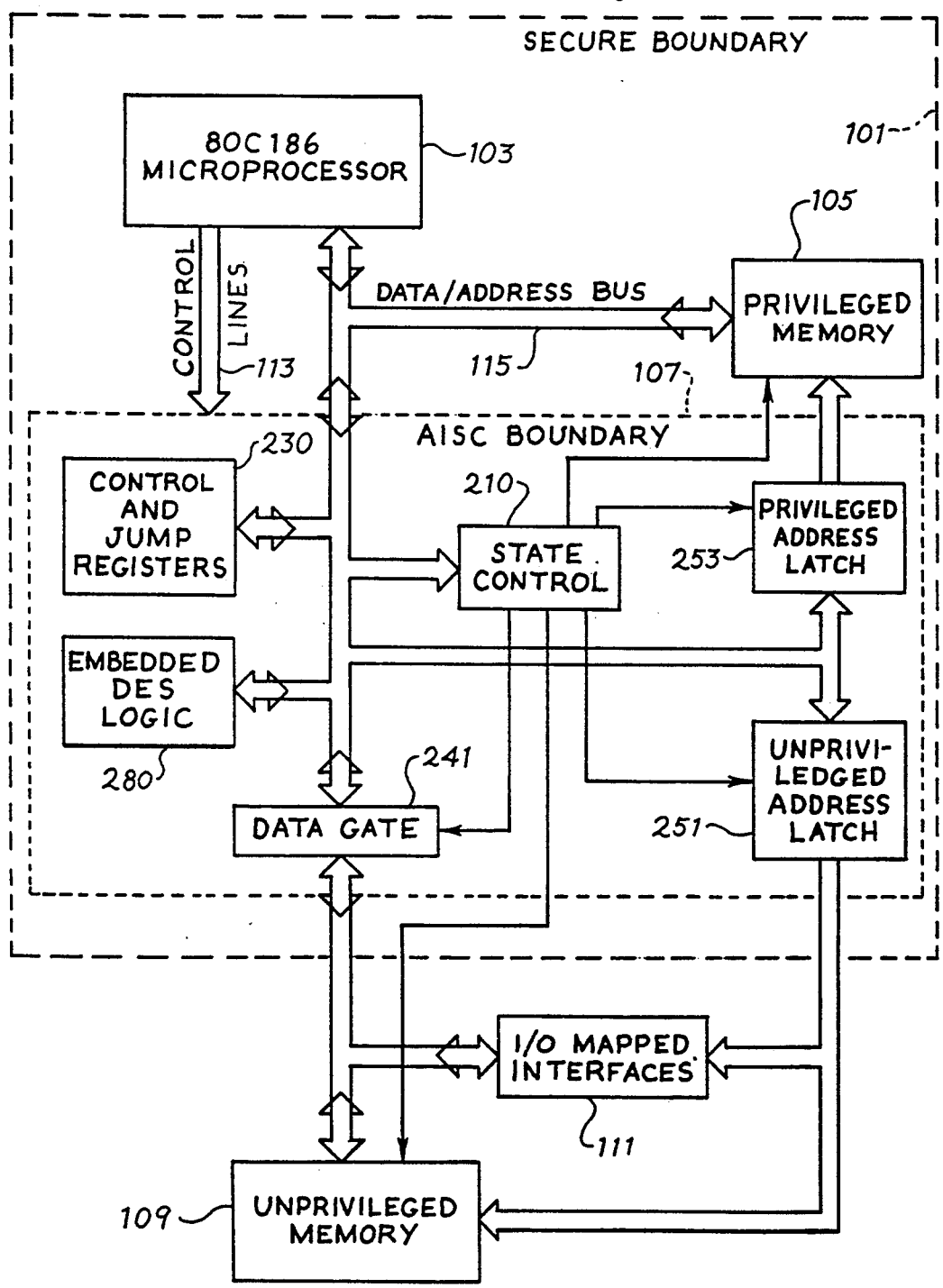
FIG. 1 is a block diagram of the secure module showing the microprocessor, protected memory and gate array.

A preferred embodiment of the invention will now be described in conjunction with the drawing FIGS. 1 through 4 starting with FIG. 1. A secure boundary appears as dotted line 101 which represents the protective enclosure of a tamper resistant module such as is disclosed in U.S. application Ser. No. 07/693,991. The circuits inside of 101 cannot be monitored or probed to ascertain their functions, operation or content. Included inside secure boundary 101 is a processor such as an INTEL(R) 80C186 microprocessor 103, a privileged memory 105, and a gate array 107. Gate array 107 is also called an application specific integrated circuit (ASIC) in the drawings. In addition to the circuits inside the secure module represented by boundary 101, an unprivileged memory 109 is provided in order to have a place for storage of custom programs and data to implement new functions that a specific user may need. It is important that these new functions not be able to compromise the security of data and programs residing in the privileged memory 105. To that end, gate array 107 is interposed between the bidirectional address/data bus coming from the microprocessor 103 and responsive to sequences of addresses, enters privileged state or mode and alternately enters unprivileged state. In privileged state, the processor works with memory 105 and no data or addresses of memory 105 are accessible rom outside of the secure module represented by boundary 101. In unprivileged state, the microprocessor works only with memory 109 and against, any data, addresses or programs in memory, 105 are made unavailable. In addition to memory 1089, the computer of the invention may require conventional I/O devices which are connected to registers 111 for accomplishing such I/O functions as printing, storing to disk or diskette, displaying data, reading data from an ID card, etc.

Turning now to the circuits inside the gate array 107, simplified block representations are included in FIG. 1 to facilitate understanding of the invention when later referring to FIG. 2. In FIG. 1, the circuits implementing the state control functions are shown as star control block 210. Block 210 monitors the address lines and controls whether the computer is in protected or unprotected state. Also implemented in gate array 107 are control and jump registers 230 which are mapped into both privileged and unprivileged address spaced but they can only be read as a memory address. In order to write addresses into these registers, the computer must enter privileged state and write them using an I/O operation. This limitation prevents programs in memory 109 from writing control addresses and also prevents inadvertently writing control addresses in a memory operation in privileged state. Memory 105 is provided with address control through privileged address latch 253 in privileged state. Likewise, memory 109 is provided with address control through unprivileged address latch 251 in unprivileged state. Data gate 241 is connected to sate control logic 210 which controls gate 241 to allow data to pass only during unprivileged state when memory 105 is inaccessible and during an I/O read or write operation to memory 109 during unprivileged state which will be described in greater detail with respect to FIG. 2.

Figure 2:
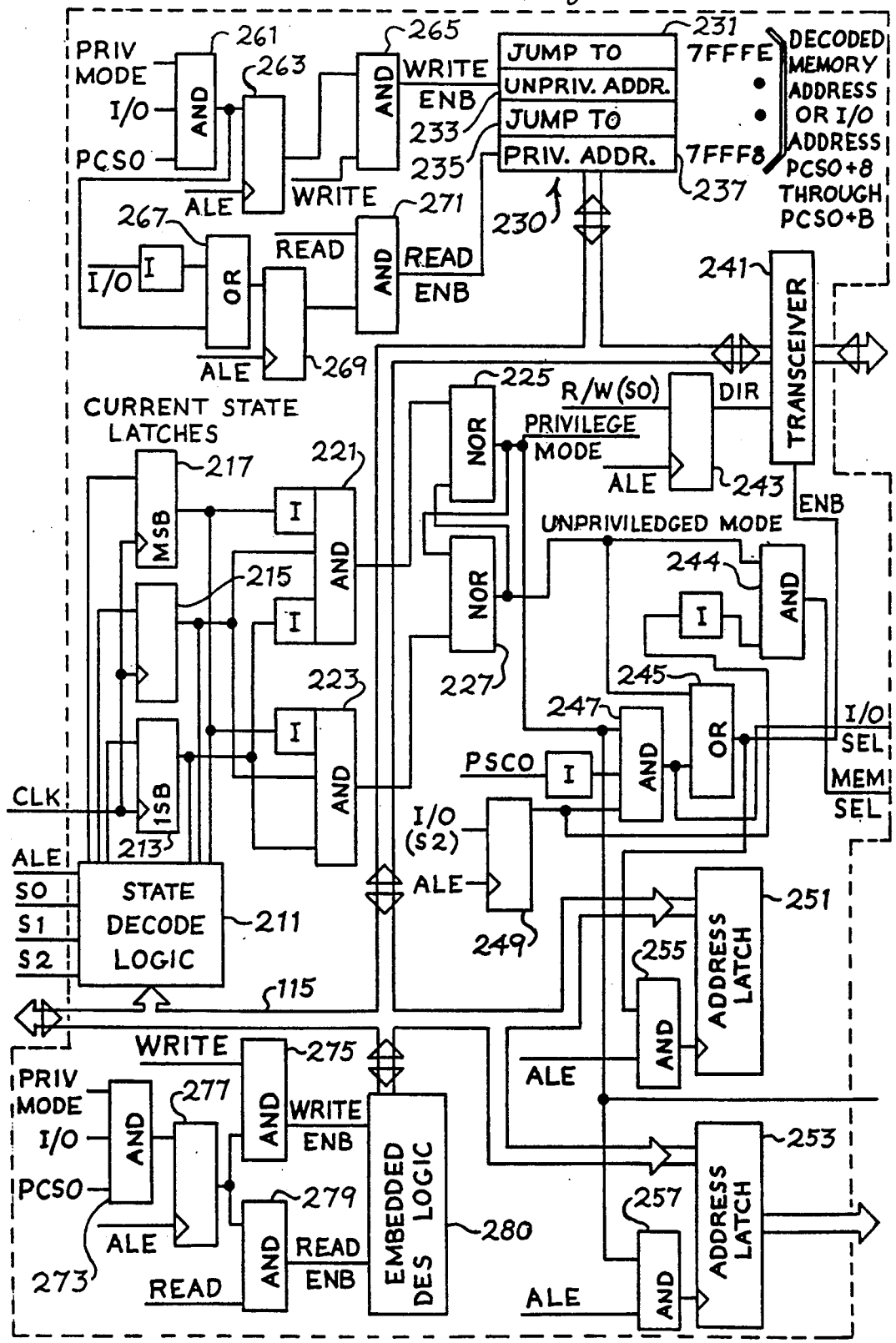
FIG. 2 is a detailed block diagram of the circuitry of the gate array.

Also connected to bus 115 is embedded DES processor logic 280 which is further described with respect to FIG. 2.

Referring now to FIG. 2 of the drawings, a detailed block diagram of the logic circuits in the gate array 107 ar shown in greater detail. The 80C186 microprocessor bidirectional address and data bus 115 appears tat the bottom of the figure. Control line 113 inputs to the gate array 107 at the left include the computer clock, Address Latch Enable (ALE), S0, S1, and S1. The S0, S1, and S2 lines are inputs to the state decode logic 211, which along with the gates 213 through 227 and 245, 247 comprise state control block 210 of FIG. 1. Outputs from logic 211 set flip flop latches 213, 215, and 217 respectively. Latch 213 is a least significant bit and latch 217 is a most significant bit of the state counter which stores account of five different states. The states are 303, 313, 323, 333, and 343, as shown in the state diagram of FIG. 3.

Outputs from Latches 213, 215, and 217 are connected back to state logic decode 211, in order to implement the state control shown in FIG. 3. Additionally, the outputs of these latches 213 thru 217 are connected to AND gates 221 and 2223. NOR gates 225 and 227 comprise another flip-flop latch which remembers whether the gate array has placed the computer in privileged state or unprivileged state. The output and AND gate 221 is connected to the input of NOR gate 225 to set privileged state. The output of AND gate 223 is connected to NOR gate 227 to reset privileged state to unprivileged state.

In addition to the special latches just described, four registers shown together as block 230 in FIG. 1 are implemented inside the gate array 107. These registers are 231, 233, 235, and 237. Registers 231 thru 237 can be read by the processor 103 in either privileged mode or unprivileged mode in order to control the processor to start execution of the programing either mode at the address stored in these registers 231 thru 237. These registers 231 thru 237 can only be loaded or written to by an I/O write operation in privileged mode. AND gate 271 allows reading in either mode via OR gate 267 and AND gate 269. Writing is only permitted in privileged mode as determined by AN D gate 261, latch 263 and AND gate 265.

The bidirectional address/data bus 115 from the 80C186 microprocessor is connected to state logic decode 211 in order to provide the addresses which, together with a bus operations cause change of state. Likewise, this bus is connected to the registers 231 thru 237 in order to read those registers in either privileged or unprivileged mode. In addition, this bus is connected to the Data Encryption Standard (DES) processor logic 280 also implemented in the gate array 107, which may be used to accomplish encryption functions in a secure manner. Data is gated into and out of encryption processor 280 by gates 273, 275, 277, and 279 as shown in FIG. 2. It will be recognized the the encryptions processor 280 could equally have been implemented outside of the gate array also long as it remained implemented inside of the secure module. Likewise functions other than encryption can be placed inside of the secure module in the form of any implementable co-processor in order to be able to execute such functions in a secure manner.

The bus 115 is also connected to data gate transceiver 241. Transceiver 241 has a bidirectional input, DIR from AND gate 243. AND bate 243 controls the direction of data flow through the data gate transceiver 241 by gating the condition of read or write (SO active or inactive respectively) through AND gate 243 when the address latches are not enabled (not ALE).

In addition to the DIR like for controlling direction, an enable line is provided which enables or gates data through data bate transceiver 241. The enable line is driven by OR gate 245, which is in turn controlled by the unprivileged mode line and as well as AND gate 247. AND gate 247 provides an output which permits the processor to read and write data in unprivileged memory 109 while the processor is operating in privileged mode but only as an I/O function. Accordingly, inputs to AND gate 247 include privileged mode, not Peripheral Chip Select zero (PCSO) and the input of I/O select latch 249.

Continuing on with the connections of the bus 115, address latches 251 and 253 also are connected to the bus. Like transceiver 241, address latches 251 and 253 are controlled by gates and the ALE line but in this case to store address information. In addition to the ALE line, AND gate 255, which controls the unprivileged address latches 251, is driven by the unprivileged mode output from NOR gate 227. Alternately, privileged address latch 253 is gates by AND gate 257 only when an privileged mode output is received form NOR gate 225. In this way, addresses for the privileged real memory address space and the unprivileged real memory address space are alternately generated depending upon the state of this secure computer.

As mentioned earlier with respect to FIG. 1, the control registers 230 are mapped into the memory address spaces of memories 105 and 109 for reading during a indirect far jump but are to be written only in privileged mode during an I/O operation by microprocessor 103. Therefore it is important to prevent an I/O write operation to memory during unprivileged mode. To prevent writing control registers 230 in unprivileged mode, AND gate 244 is inhibited by the output of I/O select latch 249.

OPERATION OF THE PREFERRED EMBODIMENT

Referring now to the state diagram in FIG. 3, the operation of the invention will be described with reference to the control registers 230 of FIGS. 1 and 2. The diagram of FIG. 3 shows the operation of the address decode and state control circuits of state decode logic 211 which operates in conjunction with state latches 213, 215, and 217 shown in FIG. 2. The mode of operation of the computer is changed to privileged or unprivileged by an unconditional inter-segment indirect jump (indirect far jump) to addresses 7FFF8 or 7FFC respectively. The execution of a 80C186 indirect far jump with a target location of 7FFF8 or 7FFFC will cause sequential memory accesses to 7FFF8 and 7FFFA or 7FFFC and 7FFFE respectively. The state diagram of FIG. 3 shows the sequential bus operations required to cause the memory maps to be switched between privileged and unprivileged modes.

Whenever a system or other reset occurs, the computer is placed in privileged mode at action 301 and then the state control logic goes to state zero at 303. The state logic remains in state zero until an address 7FFF8 or and address 7FFFC is decoded during a bus operation. A bus operation is defined as the memory access resulting from the execution of a read memory instruction.

If an 7FFFC is decoded at action 307 the state latch 217 is set to place the state logic in state four at 343. If the next bus operation address is into a 7FFFE, the state logic returns to state zero at action 347 by resetting latches 213, 215, and 217. Alternately, if the next bus operation address is 7FFFE, detected at action 3456, the state logic goes to state three at 333 by the setting of latches 213 and 215 shown in FIG. 2. After being in state three, the privileged mode latch made up of NOR gates 225 and 227 is reset and thereafter under clock control not shown, the state logic returns at 335 to state zero 303 with the computer in unprivileged mode and the unprivileged memory map enabled.

While the state decode logic 211 is in state zero regardless of the path through which it arrived at that state and an 7FFF8 is decoded at action 305 the state latch 213 is set to place the logic in state one at 313. I the next bus operation address is not a 7FFFA, the logic returns to state are at action 307 by resetting latches 213, 215, and 217. Alternately, i the next bus operation address is 7FFFA, detected at action 315, the logic goes to state two at 323 by the setting of latches 213 and 215 shown in FIG. 2. After being in state two, the privilege mode latch made up of NOR gates 225 and 227 is set to place the computer in privileged mode. Thereafter under clock control not shown, the logic returns at action 317 to state zero 303 with the privileged memory map enabled thereby leaving the computer in privileged mode.

While the invention has been shown with respect to disclosed headwater and method that are considered to be an optimum embodiment, it will be readily understood that any variations in form and detail of such complex mechanism are readily obtained by those skilled in the art. The preferred embodiment described above also a computer to implement for example a DES encryption function in a secure environment while at the same time providing additional memory available to the computer owner for programming other cryptographic functions such as perhaps a public key algorithm. In particular, other microprocessors having equivalent signals and busses can be used to implement the computer. Those skilled in heart of computer design will recognize many modifications and adaptations and that some of the features of the preferred embodiment may be employed without corresponding use of other features without departing from the spirit and scope of the invention as defined by the following claims.

What is claimed is:

1. Memory protection means comprising:
   a protected memory and a processor inside a secure enclosure;
   an unprotected memory accessible from outside said secure enclosure;
   address decode inside said protected enclosure connected to address lines from said processor for recognizing at least two first predetermined addresses in sequence to enter unprivileged mode, said address decode recognizing at least two second predetermined addresses in sequence to enter privileged mode; and
   gate means inside said protected enclosure for connecting said address lines and data lines from said processor to said protected memory in said privileged mode and alternately connecting said address and data lines to said unprotected memory, said address and data lines being inaccessible from outside said secure enclosure during privileged mode.

2. The memory protection means of claim 1 further comprising:
   control register means connected to said address decode in said secure enclosure, said control register mapped into a memory address space of both said unprotected memory and said protected memory.

3. The memory protection means of claim 2 further comprising:
   sequencing means connected to said address decode for controlling entry into privileged mode and entry into unprivileged mode.

4. The memory protection means of claim 2 further comprising:
   I/O control gates to permit the writing of data into said control register means only unprivileged mode.

5. The memory protection means of claim 1 further comprising:
   I/O gate mans for allowing said processor to read and and to write said unprotected memory while in privileged mode.

6. In a computer in which a processor can access a first memory and a second memory, a system for protecting said first memory comprising:
   address decode means connected to address lines from said processor for recognizing a first predetermined pattern of addresses to enter unprivileged mode, said address decode means recognizing a second predetermined pattern of addresses to enter privileged mode;
   enclosure means for enclosing said processor, said first memory, said address decode means and a gate means in a tamper resistant environment;
   said gate means connected to said processor, said first memory, said second memory and said address decode means, said gate means being responsive to said address decode means or connecting said address lines and data lines from said processor to said unprotected memory in said privileged mode and alternately connecting said address and data lines to said unprotected memory in unprivileged mode, address and data information on said address and data lines being unaccessible from outside said tamper resistant environment during privileged mode.

* * * * *